United States Patent
Sawamoto et al.

(10) Patent No.: US 10,044,017 B2
(45) Date of Patent: Aug. 7, 2018

(54) AROMATIC POLYAMIDE POROUS FILM, SEPARATOR FOR BATTERY, AND BATTERY

(75) Inventors: Atsushi Sawamoto, Otsu (JP); Kenta Nishibara, Otsu (JP); Akimitsu Tsukuda, Otsu (JP)

(73) Assignee: Toray Industries, Inc. (JP)

( * ) Notice: Subject to any disclaimer, the term of this patent is extended or adjusted under 35 U.S.C. 154(b) by 730 days.

(21) Appl. No.: 14/371,081

(22) PCT Filed: Sep. 4, 2012

(86) PCT No.: PCT/JP2012/072419
§ 371 (c)(1),
(2), (4) Date: Jul. 8, 2014

(87) PCT Pub. No.: WO2013/105300
PCT Pub. Date: Jul. 18, 2013

(65) Prior Publication Data
US 2014/0329155 A1    Nov. 6, 2014

(30) Foreign Application Priority Data
Jan. 13, 2012    (JP) ................................. 2012-004767

(51) Int. Cl.
*H01M 2/16* (2006.01)
*H01M 10/052* (2010.01)

(52) U.S. Cl.
CPC ....... *H01M 2/1653* (2013.01); *H01M 10/052* (2013.01); *H01M 2220/20* (2013.01); *Y02E 60/122* (2013.01); *Y02T 10/7011* (2013.01)

(58) Field of Classification Search
CPC .................................................. H01M 2/1653
See application file for complete search history.

(56) References Cited

U.S. PATENT DOCUMENTS

| | | | | |
|---|---|---|---|---|
| 5,290,414 | A | * | 3/1994 | Marple ................. H01M 2/14 204/252 |
| 5,856,426 | A | | 1/1999 | Takahashi et al. |
| 2008/0113177 | A1 | | 5/2008 | Sueoka et al. |
| 2012/0308898 | A1 | * | 12/2012 | Sawamoto ............. C08J 5/2256 429/249 |

FOREIGN PATENT DOCUMENTS

| | | |
|---|---|---|
| JP | 05-335005 | 12/1993 |
| JP | 2001-098106 | 4/2001 |
| JP | 2002-201304 | 7/2002 |
| JP | 2005-209989 | 8/2005 |
| JP | 2006-225499 | 8/2006 |
| JP | 2008-243805 | 10/2008 |
| JP | 2010-092881 | 4/2010 |
| JP | 2011-068883 | 4/2011 |
| WO | 2006/087859 | 8/2006 |
| WO | 2011/089785 | 7/2011 |
| WO | WO-2011089785 A1 * | 7/2011 ............ C08J 5/2256 |

OTHER PUBLICATIONS

Supplemental European Search Report dated Jul. 23, 2015 of corresponding European Application No. 12865164.3.

* cited by examiner

*Primary Examiner* — Maria J Laios
*Assistant Examiner* — Robert Scott Carrico
(74) *Attorney, Agent, or Firm* — DLA Piper LLP (US)

(57) ABSTRACT

An aromatic polyamide porous film has a total number of branch points of pores in an area of 3 cubic micrometers obtained by three-dimensional structural analysis is 2,000 to 20,000, which ensures high rate characteristics and is also capable of suppressing deterioration of cycle characteristics and storage characteristics as well as abnormal heat generation, when used as a separator for battery, and also has excellent heat resistance; and a separator for battery and a battery, each including the aromatic polyamide porous film.

12 Claims, No Drawings

AROMATIC POLYAMIDE POROUS FILM, SEPARATOR FOR BATTERY, AND BATTERY

TECHNICAL FIELD

This disclosure relates to an aromatic polyamide porous film, and particularly to an aromatic polyamide porous film which can be suitably used as a separator of electric storage devices such as a battery.

BACKGROUND ART

Nonaqueous secondary batteries such as lithium ion secondary battery (LIB) have already been prevailing widely, mainly in portable equipment applications. In the future, it is expected that nonaqueous secondary batteries will be rapidly enlarged in in-vehicle applications such as electric vehicles (EV), hybrid electric vehicles (HEV), plug-in hybrid electric vehicles (PHEV), and the like. While promoting higher capacity, higher rate characteristics and upsizing in the development of in-vehicle LIBs, higher safety is required more than before. Accordingly, a separator is also required to have excellent ion permeability which enables permeation of lithium ions with uniform and low resistance, and safety such as heat resistance or short-circuiting resistance.

To cope with high-level demands for heat resistance among safety, a separator including a heat-resistant protective layer (HRL) provided on one or both surface(s) of a polyolefin porous film is disclosed (see, for example, Japanese Unexamined Patent Publication (Kokai) No. 2008-243805 and Japanese Unexamined Patent Publication (Kokai) No. 2010-92881). However, because of limitative effects of HRL, a large-sized battery may be unable to effectively suppress shrinkage of the separator when meltdown of the polyolefin layer occurs over a large area, thus causing short-circuiting, especially at the end. Furthermore, it is usually difficult to form into a thin film since the separator is in the form of a laminate.

Thus, there is a need to use a material having excellent heat resistance as the separator to enhance safety of the battery. For example, Japanese Unexamined Patent Publication (Kokai) No. 5-335005, Japanese Unexamined Patent Publication (Kokai) No. 2005-209989 and Japanese Unexamined Patent Publication (Kokai) No. 2001-98106 disclose that an aromatic polyamide (aramid) having excellent heat resistance and oxidation resistance is used alone as a separator. Japanese Unexamined Patent Publication (Kokai) No. 5-335005 is an example which discloses applications of an aramid nonwoven fabric or an aramid paper as the separator. However, when a nonwoven fabric or a paper-like sheet is allowed to have a thickness of 50 μm or less, sufficient mechanical strength is not attained and it is difficult to industrially produce those having uniform and fine gap between fibers, thus causing fears that short-circuiting might occur. Meanwhile, Japanese Unexamined Patent Publication (Kokai) No. 2005-209989 is an example which discloses an aramid porous film formed by using a so-called "wet type" method in which an aramid solution is cast, followed by immersion in a solidification bath, thus causing precipitation. However, in the wet type method, a coating layer is formed on a surface, and a structure with numerous septa between pores and an independent pore are formed, and also the shape of the pore varies depending on a thickness direction of the film, thus making it difficult to control a pore structure. Whereas the wet type method having such problems, Japanese Unexamined Patent Publication (Kokai) No. 2001-98106 discloses a method in which an aramid film containing metal oxide fine particles dispersed therein is formed, and then the fine particles are dissolved and removed to obtain a porous film containing uniform pores. However, the porous film obtained by that method is a porous film in which the portion connecting between pores formed as a result of coming off of fine particles is a fine gap and this connection portion can serve as a bottle neck. In addition, remaining fine particles may come off when used as a separator.

It could therefore be helpful to provide a porous film which ensures high rate characteristics and is also capable of suppressing deterioration of cycle characteristics and storage characteristics as well as abnormal heat generation, when used as a separator for battery, and also has excellent heat resistance; and a separator for battery and a battery, each including the porous film.

SUMMARY

We thus provide:

(1) An aromatic polyamide porous film, wherein the total number of branch points of pores in the area of 3 cubic micrometers obtained by three-dimensional structural analysis is 2,000 to 20,000.

(2) The aromatic polyamide porous film according to the above (1), wherein the total number of branch points of pores in the area of 3 cubic micrometers obtained by three-dimensional structural analysis is 5,000 to 15,000.

(3) The aromatic polyamide porous film according to the above (1) or (2), wherein an average tortuosity in a thickness direction obtained by three-dimensional structural analysis is 1.2 to 2.1, and an average tortuosity obtained by the same structural analysis is 1.0 to 2.1 in both longitudinal and width directions.

(4) The aromatic polyamide porous film according to any one of the above (1) to (3), wherein a lithium ion diffusion coefficient in a thickness direction measured by a pulsed-field-gradient NMR analysis method is 4.0 to 12.0 m$^2$/s.

(5) The aromatic polyamide porous film according to any one of the above (1) to (4), wherein a thickness is 9 to 40 μm, and the Gurley permeability is 5 to 200 seconds/100 ml.

(6) A separator for battery, including the aromatic polyamide porous film according to any one of the above (1) to (5).

(7) A battery including the separator for battery according to the above (6).

Our aromatic polyamide porous films can be suitably used as a separator for battery such as a lithium ion secondary battery since it has excellent heat resistance and has high porosity regardless of being fine, and also has a few-septate pore structure. In a secondary battery in which the aromatic polyamide porous film is used as a separator, a porous film has a fine pore structure, thus making it possible to prevent short-circuiting of positive and negative electrodes from occurring due to lithium metal precipitated when used as a battery, and foreign substances mixed during the production process. Because of having a pore structure which includes less bottle neck portion of a pore path, which is capable of rate-controlling permeation of lithium ions, and less septum between pores, which leads to an increase in permeation path length and localization of a permeation path, and which enables ions to freely diffuse in a thickness direction and a film face direction, it is possible to obtain high rate characteristics and prevent deterioration of performances when used for a long period of time. Furthermore, in the above structure, uniform diffusion of lithium ions in a face leads to suppression of localization of a current density, thus making it possible to effectively prevent clogging of the pores and short-circuiting from occurring due to precipitation of lithium metal when used for a long period of time or when a lithium metal negative electrode is used. Accordingly, a secondary battery using the aromatic polyamide porous film as a separator ensures high rate characteristics and is also capable of suppressing deterioration of cycle characteristics and storage characteristics as well as abnormal heat generation. Furthermore, the aromatic polyamide porous film can maintain high safety even if the temperature of the obtained secondary battery reaches high temperature by thermal runaway since it has excellent heat resistance.

DETAILED DESCRIPTION

Our aromatic polyamide is preferably an aromatic polyamide including repeating unit(s) represented by the following Chemical Formula (1) and/or Chemical Formula (2).
Chemical Formula (1):

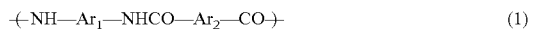  (1)

Chemical Formula (2):

  (2)

Examples of $Ar_1$, $Ar_2$ and $Ar_3$ include groups selected from the groups represented by the following Chemical Formulas (3) to (7).

Chemical Formulas (3) to (7):

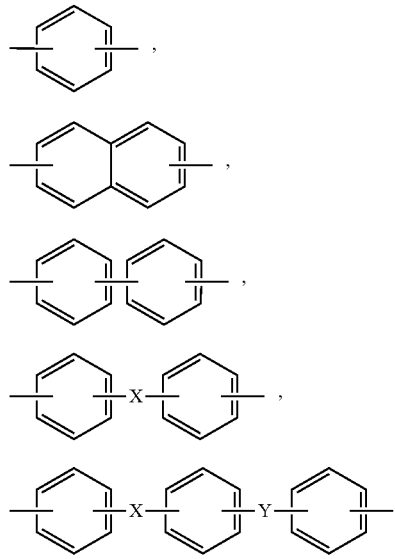

It is possible to use, as X and Y, groups selected from:
Group A: —O—, —CO—, —$CO_2$—, —$SO_2$—, and
Group B: —$CH_2$—, —S—, —$C(CH_3)_2$—.

Furthermore, it is preferred that some of hydrogen atoms on these aromatic rings in $Ar_1$ to $Ar_3$ are substituted with substituents, for example, halogen groups such as fluorine, bromine and chlorine; nitro groups; cyano groups; alkyl groups such as methyl, ethyl and propyl; alkoxy groups such as methoxy, ethoxy and propoxy; and the like, since solubility in solvent is improved, and the moisture absorption coefficient is lowered to decrease the dimensional change caused by temperature change. It is particularly preferred to have electron-withdrawing substituents such as a halogen group, a nitro group and a cyano group since the obtained product is excellent in electrochemical oxidation resistance and can prevent degeneration such as oxidation at the positive electrode side when used as a separator. Of these substituents, a halogen group is more preferred and a chlorine atom is most preferred. Hydrogen in an amide bond composing a polymer may be substituted with a substituent.

It is preferred that aromatic rings having para orientation in $Ar_1$ to $Ar_3$ account for 50 mol % or more, more preferably 60 mol % or more, and most preferably 100 mol % of all aromatic rings. As used herein, the "para orientation" means the state where divalent bonds composing the main chain of the aromatic ring are coaxial or parallel to each other. If the amount of the aromatic rings having this para orientation is less than 50 mol %, the obtained aromatic polyamide porous film (hereinafter may be sometimes referred to simply as porous film) may have insufficient rigidity and heat resistance, and thus a pore structure may not be sufficient.

Furthermore, it is particularly preferred that when the aromatic polyamide includes 30 mol % or more of a repeating unit represented by Chemical Formula (8), it is possible to achieve both characteristics such as oxidation resistance, heat resistance and humidity stability of the porous film, and solubility in solvent and film-forming properties during production, and the amount of the aromatic polyamide is most preferably 40 mol % or more.

Chemical Formula (8):

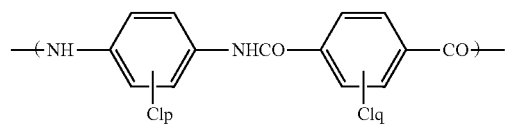  (8)

(wherein p and q are integers of 0 to 4)

The total number of branch points of pores in the area of 3 cubic micrometers obtained by three-dimensional structural analysis is preferably 2,000 to 20,000, more preferably 5,000 to 15,000, and still more preferably 8,000 to 15,000. Control of the total number of branch points of pores within the above range enables achievement of both satisfactory ion permeability and short-circuiting resistance. Namely, large total number of branch points of pores realizes ion permeation with high degree of freedom in diffusion of lithium ions in a thickness direction and a film face direction, and low resistance, thus making it possible to suppress the growth of lithium metal which is the cause of micro-short-circuiting. Namely, it is considered that dendrite-like lithium metal as one of the causes of short-circuiting is likely to grow at the portion with locally high current density, and that the above-mentioned pore structure, which undergoes ion diffusion uniformly in a face, is effective in the sense that the growth of dendrite-like lithium metal is suppressed. These effects ensure high rate characteristics and are capable of suppressing deterioration of cycle characteristics and storage characteristics as well as abnormal heat generation, when used as a separator for battery. If the total number of branch points of pores is less than 2,000, the permeation path of lithium ions may be limited, thus causing an increase in resistance due to the permeation path length, and precipitation of lithium metal due to a local increase in current density. Micro-short-circuiting may occur due to lithium metal precipitated when used repeatedly or stored. It is preferred that the formulation of a film forming solution and the production conditions of a porous film are set as mentioned below to control the total number of branch points of pores within the above range. More specifically, the total number of branch points can be increased by increasing the polymerization degree of an aromatic polyamide within the range mentioned below, and controlling absolute humidity and heat capacity of a support when water is mixed in the film forming solution and a porous film is produced, thus producing a porous film more rapidly without lowering the solution viscosity.

The average tortuosity in a thickness direction obtained by three-dimensional structural analysis is preferably 1.2 to 2.1, more preferably 1.2 to 2.0, and still more preferably 1.3 to 1.6. As used herein, the "average tortuosity in a thickness direction" is the value obtained by dividing an average of path lengths of all pores in a thickness direction measured by the method mentioned in Examples mentioned below by a vertical distance between the start side (of analytical area) and the end side (of analytical area) (thickness of a film in an analytical range in a thickness direction). The smaller the average tortuosity in a thickness direction, lithium ion permeates more easily in a thickness direction, and thus high rate characteristics are obtained more easily when used as a separator for battery. If the average tortuosity in a thickness direction is less than 1.2, there may arise short-circuiting between positive and negative electrodes due to lithium metal precipitated when used, foreign substances mixed during the production process, and the like. If the average tortuosity in a thickness direction exceeds 2.1, rate characteristics are lowered when used as a separator for battery because of large resistance. It is preferred that the formulation of a film forming solution and the production conditions of a porous film are set as mentioned below to control the average tortuosity in a thickness direction within the above range. More specifically, it is preferred that a porous film is produced by using a film forming solution in which the concentrations of an aromatic polyamide and a hydrophilic polymer, and the solution viscosity have been set within the range mentioned below, and controlling the absolute humidity when a porous film is produced, and the heat capacity of a support within the range mentioned below. It is effective that mixing of water in the film forming solution is performed within the range mentioned below.

The average tortuosity in both longitudinal direction and width direction obtained by the above-mentioned three-dimensional structural analysis is preferably 1.0 to 2.1, more preferably 1.0 to 2.0, and still more preferably 1.0 to 1.6. Control of the average tortuosity in a longitudinal direction and a width direction within the above range can realize ion permeation with high degree of freedom in diffusion of lithium ions in a film face direction, and low resistance, thus making it possible to obtain high rate characteristics when used as a separator for battery. Furthermore, uniform diffusion of lithium ions in a face leads to suppression of a local increase in current density, thus exerting high effect of preventing clogging of pores and short-circuiting due to precipitation of lithium metal. If the average tortuosity in a longitudinal direction or a width direction exceeds 2.1, the degree of freedom of diffusion of lithium ions in a film face direction may be lowered, leading to limitation of the permeation path of ions, thus causing precipitation of lithium metal due to an increase in resistance and a local increase in current density. It is preferred that a few-septate pore structure is formed and that the formulation of a film forming solution, the production conditions of a porous film are set within the range mentioned below so as to control the average tortuosity in both longitudinal and width directions. More specifically, it is preferred that the polymerization degree of an aromatic polyamide is increased within the range mentioned below and the solution viscosity of a film forming solution is increased while suppressing the concentrations of an aromatic polyamide and a hydrophilic polymer in the film forming solution to a low value. Furthermore, it is easy to obtain a few-septate pore structure by controlling mixing of water in a film forming solution, and absolute humidity and heat capacity of a support in the case of producing a porous film within the range mentioned below, and producing a porous film more rapidly without lowering the solution viscosity.

The lithium ion diffusion coefficient in a thickness direction measured by pulsed-field-gradient NMR analysis is preferably 4.0 to 12.0 $m^2/s$, more preferably 5.0 to 12.0 $m^2/s$, and still more preferably 7.0 to 12.0 $m^2/s$. If the lithium ion diffusion coefficient is less than 4.0 $m^2/s$, rate characteristics are lowered when used as a separator for battery because of large resistance. If the lithium ion diffusion coefficient exceeds 12.0 $m^2/s$, the strength of the porous film is lowered. It is preferred to have a pore structure which does not include a bottle neck portion capable of rate-controlling permeation of lithium ions, and includes less septum between pores which hinders permeation in a film face direction, and to set the formulation of a film forming solution, the production conditions of a porous film within the range mentioned below, so as to set the lithium ion diffusion coefficient within the above range regardless of having a fine pore structure.

The thickness of the aromatic polyamide porous film is preferably 9 to 40 μm, and more preferably 9 to 30 μm. If the thickness is less than 9 μm, the film may be broken during processing because of low strength, and short-circuiting may occur between electrodes when used as a separator. If the thickness exceeds 40 μm, rate characteristics may be lowered by an increase in internal resistance, and thickness of an active material layer to be incorporated into the battery may decrease, leading to a decrease in capacity per volume, when used as a separator. It is possible to control the thickness of a porous film by concentration of a film forming solution, viscosity of a film forming solution, casting thickness, porosity forming conditions, wet bath temperature, temperature during heat treatment, drawing conditions, and the like.

Gurley permeability is preferably 5 to 200 seconds/100 ml, and more preferably 10 to 150 seconds/100 ml. If the Gurley permeability is less than 5 seconds/100 ml, the film may be broken during processing because of a decrease in strength, and short-circuiting may occur between electrodes when used as a separator. If the Gurley permeability exceeds 200 seconds/100 ml, rate characteristics are lowered because of large resistance when used as a separator. It is preferred to have a few-septate pore structure which can hinder permeation in a film face direction, and to set the formulation of a film forming solution and the production conditions of a porous film within the range mentioned below to control the Gurley permeability within the above range regardless of being a fine pore structure.

The porosity is preferably 60 to 90%, and more preferably 65 to 80%. If the porosity is less than 60%, deterioration of performances may occur due to liquid drying-up during repetition of charging and discharging because of a small holding amount of an electrolytic solution when used as a separator for battery. Also, internal resistance may increase, leading to low rate characteristics because of large resistance of ion permeation when used as a separator for battery. If the porosity exceeds 90%, it is not preferred to use as a separator as a result of a decrease in mechanical strength. It is preferred that the formulation of a film forming solution and the production conditions of a porous film are set within the range mentioned below to control the porosity within the above range.

The thermal shrinkage rate at 200° C. in both longitudinal direction (MD) and width direction (TD) is preferably −0.5 to 2.0%, and more preferably −0.5 to 1.0%. If the thermal shrinkage rate exceeds 2.0%, short-circuiting may occur at the end of a battery due to shrinkage of a separator in the case of abnormal heat generation of a battery. In the aromatic polyamide, it is preferred that aromatic rings having para orientation account for 50 mol % or more of all aromatic rings, and also the logarithmic viscosity is as high as possible within the range mentioned below to control the thermal shrinkage rate within the above range. It is also preferred that the formulation of a film forming solution and the production conditions of a porous film are set as mentioned below, thus forming a pore structure which is fine and uniform in a thickness direction. Furthermore, it is also effective that a heat treatment is applied to a porous film under the conditions mentioned below, and relaxation is applied in that case.

The stress at break in at least one direction measured in accordance with JIS-K7127 (1999) is preferably 10 MPa or more. If the stress at break is less than 10 MPa, a film may be broken due to high tension, tension variation, and the like during processing, leading to deterioration of productivity. The stress at break is more preferably 20 MPa or more, and still more preferably 30 MPa or more since the productivity is improved. There is no particular limitation on the upper limit, and a porous film usually has the upper limit of about 1 GPa. In the aromatic polyamide, it is preferred that aromatic rings having para orientation account for 50 mol % or more of all aromatic rings, and also the logarithmic viscosity is as high as possible within the range mentioned below to control the stress at break within the above range.

The elongation at break in both longitudinal direction (MD) and width direction (TD) measured in accordance with JIS-K7127 (1999) is preferably 10% or more. High elongation can reduce film breakage during processing step, thus making it possible to process at a high speed. When used as a separator for battery, it is possible to follow expansion and shrinkage of an electrode without breaking during charging and discharging, thus ensuring durability and safety of the battery. Since processability, durability and safety are more improved, the elongation at break is more preferably 20% or more, and still more preferably 30% or more. There is no particular limitation on the upper limit, and a porous film usually has the upper limit of about 200%. In the aromatic polyamide, the logarithmic viscosity is preferably as high as possible within the range mentioned below to control the elongation at break within the above range. It is also preferred that the formulation of a film forming solution and the production conditions of a porous film are controlled as mentioned below, thus forming a fine and uniform pore structure. Furthermore, it is also effective that a heat treatment is applied to a porous film under the conditions mentioned below, and relaxation is applied in that case.

The piercing strength of both surface and back surface is preferably 50 N/mm or more. As used herein, the "piercing strength" is the value obtained by dividing a maximum load, in the case of piercing a needle at a speed of 300 mm/minute vertically to a measuring surface of a porous film using a needle having a tip curvature radius of 1.5 mm, by the thickness of the porous film. The piercing strength of less than 50 N/mm may lead to breakage of a film, and short-circuiting of positive and negative electrodes due to lithium metal precipitated when used as a battery, and foreign substances mixed during the production process. The piercing strength is more preferably 100 N/mm or more. In the aromatic, the logarithmic viscosity is preferably as high as possible within the above range so as to control the piercing strength within the range mentioned below. It is also preferred that the formulation of a film forming solution and the production conditions of a porous film are controlled within the range mentioned below, thus forming a fine pore structure.

The methods of producing a porous aromatic polyamide film will be described below. First, when the aromatic polyamide is polymerized using acid dichloride and diamine as raw materials, it is possible to employ a method in which synthesis is performed by solution polymerization in an aprotic organic polar solvent such as N-methyl-2-pyrrolidone, N,N-dimethylacetamide, dimethylformamide or dimethyl sulfoxide, a method in which synthesis is performed by interfacial polymerization using an aqueous medium, and the like. Solution polymerization in an aprotic organic polar solvent is preferred since it is easy to control the molecular weight of the polymer.

In the case of solution polymerization, it is preferred that the moisture content in the solution used for polymerization is controlled to 500 ppm or less (by mass, the same shall apply hereinafter), and more preferably 200 ppm or less to obtain a polymer having a high molecular weight. As a matter of course, diamine and acid chloride to be used have high purity, and an attention should be paid on moisture absorption. Since a polymer having an ultra high molecular weight may be produced when diamine and acid chloride are used in equal amounts, it is preferred that the molar ratio of one to the other one is adjusted within 95.0 to 99.5 mol %. It is preferred that the temperature of the solution during polymerization is cooled to 40° C. or lower since side reaction may occur and the polymerization degree may not increase sufficiently if the temperature of the polymerization rises, although polymerization reaction of aromatic polyamide is accompanied by heat generation. More preferably, the temperature of the solution during polymerization is kept at 30° C. or lower. Furthermore, hydrogen chloride is by-produced accompanying the polymerization reaction and, when hydrogen chloride is neutralized, it is preferred to use an inorganic neutralizer such as lithium carbonate, calcium carbonate or calcium hydroxide, or an organic neutralizer such as ethylene oxide, propylene oxide, ammonia, triethylamine, triethanolamine or diethanolamine.

The logarithmic viscosity ($\eta_{inh}$) of the aromatic polyamide polymer is preferably 2.0 to 3.5 dl/g, and more preferably 2.2 to 3.0 dl/g. If the logarithmic viscosity is less than 2.0 dl/g, the solution viscosity of a film forming solution may become lower than a preferred range mentioned below when a film forming solution is prepared in the content of an aromatic polyamide within the range mentioned below. As a result, septum may be formed between pores, and coarsening of the pore structure and formation of a dense coating layer may occur during the production process of a porous film, and thus final pore structure may not be desirable. Meanwhile, when a film forming solution is prepared in the content of an aromatic polyamide within the range mentioned below, aggregation between aromatic polyamide polymers may be likely to occur during the production of a porous film, leading to excessively dense pore structure or fine connection portion between pores, and thus final pore structure may not fall within the scope of the present invention. If the logarithmic viscosity is less than 2.0 dl/g, a binding force between chains due to polymer entanglement of molecular chains may decrease, leading to deterioration of mechanical properties such as toughness and strength, and an increase in thermal shrinkage rate. If the logarithmic viscosity exceeds 3.5 dl/g, it may become difficult to form a porous film.

The film forming solution used in the production process of an aromatic polyamide porous film (hereinafter may be sometimes referred to simply as film forming solution) will be described below.

As the film forming solution, a polymer solution after polymerization may be used as it is, or may be used after isolating a polymer and redissolving in the above-mentioned aprotic organic polar solvent or the inorganic solvent such as sulfuric acid. There is no particular limitation on the method of isolating an aromatic polyamide, and examples thereof include a method in which an aromatic polyamide solution after polymerization is introduced into a large amount of water to extract a solvent and a neutralization salt in water, and only a precipitated aromatic polyamide is isolate and then dried. A metal salt may be added as a dissolving auxiliary during redissolving. The metal salt is preferably a halide of an alkali metal or alkali earth metal which dissolves in an aprotic organic polar solvent, and examples thereof include lithium chloride, lithium bromide, sodium chloride, sodium bromide, potassium chloride, potassium bromide, and the like.

The content of the aromatic polyamide in 100% by mass of the film forming solution is preferably 5 to 15% by mass, and more preferably 9 to 13% by mass. If the content of the aromatic polyamide in the film forming solution is less than 5% by mass, the solution viscosity may become lower than the range mentioned below. As a result, septum may be formed between pores, and coarsening of a pore structure and formation of a dense coating layer may occur, and thus a final pore structure may not be desirable. Also, mechanical properties such as toughness and strength may deteriorate, and a thermal shrinkage rate may increase. If the content of the aromatic polyamide in the film forming solution exceeds 15% by mass, aggregation between aromatic polyamide polymers may be likely to occur in the case of producing a porous film, leading to excessively dense pore structure and fine connection portion between pores, and thus a final pore structure may not be desirable. The more the concentration of the aromatic polyamide in the film forming solution becomes lower, septum between pores may be less likely to be formed as long as the solution viscosity is within the range mentioned below.

It is preferred to mix a hydrophilic polymer in a film forming solution for the purpose of improving pore-forming ability. Mixing the hydrophilic polymer suppresses aggregation of aromatic polyamide molecules in the process of forming a porous film from the film forming solution, and induces formation of pores, and thus the pore structure is desirable. It also becomes easy to adjust the solution viscosity within the range mentioned below. The amount of the hydrophilic polymer to be mixed is preferably 1 to 10% by mass, and more preferably 2 to 6% by mass, based on 100% by mass of the film forming solution. If the content of the hydrophilic polymer in the film forming solution is less than 1% by mass, aromatic polyamide molecules may be aggregated in the process for formation of a porous film, and thus the pore structure may not be desirable. If the content exceeds 10% by mass, coarsening of the pore structure and a decrease in strength may occur in the obtained porous film. Finally, the amount of the hydrophilic polymer remaining in the porous film may increase, thus causing deterioration of heat resistance and rigidity, elution of the hydrophilic polymer in an electrolytic solution, and the like.

The hydrophilic polymer is preferably a polymer having a polar substituent, especially at least one substituent selected from the group consisting of a hydroxyl group, an acyl group and an amino group, among polymers which dissolve in an aprotic organic polar solvent. Examples of such polymer include polyvinylpyrrolidone (hereinafter may be sometimes referred to as PVP), polyethylene glycol, polyvinyl alcohol, polyacrylamide, polyacrylic acid, polyethyleneimine, and the like. Most preferably, PVP with satisfactory compatibility with an aromatic polyamide is used. The weight average molecular weight of PVP is preferably 500,000 to 2,000,000. If the weight average molecular weight is less than 500,000, heat resistance of the porous film may deteriorate and PVP may be eluted in the electrolytic solution when used as a separator when PVP having a low molecular weight remains in the porous film. If the weight average molecular weight exceeds 2,000,000, it may become difficult to form a porous film. The hydrophilic polymer may be introduced into an aromatic polyamide solution after polymerization, or a redissolved aromatic polyamide solution, or an aprotic organic polar solvent together with the isolated aromatic polyamide.

It is preferred to mix water in the film forming solution in advance so that precipitation of the polymer in the subsequent production process of a porous film is allowed to proceed rapidly and uniformly, thus allowing the pore structure to fall within the scope of the present invention. The amount of water to be mixed is preferably 2 to 20% by mass, more preferably 4 to 15% by mass, and still more preferably 8 to 15% by mass, based on 100% by mass of the film forming solution. If the content of water in the film forming solution is less than 2% by mass, precipitation of the polymer may take much time, and thus septum between pores may be likely to be formed, and coarsening of the pore structure and unhomogenization of the pore structure in a thickness direction may proceed. If the content of water in the film forming solution exceeds 20% by mass, aggregation and precipitation of the aromatic polyamide polymer may occur in the film forming solution before casting, thus forming inhomogeneous pore structure of the obtained porous film, and defects such as pinhole. There is no particular limitation on water, and it is preferred to use water treated with a reverse osmosis film, water treated with a combination of a filter, activated carbon, an ion exchange membrane, and the like, or distilled water.

Inorganic particles or organic particles may be added to the film forming solution for the purpose of forming projections on a surface of the obtained porous film, thus reducing a static friction coefficient to improve processability.

Regarding the solution viscosity of a film forming solution, the value measured at 30° C. and 10 rpm using a B type viscometer is preferably 200 to 600 Pa·s, more preferably 200 to 500 Pa·s, and still more preferably 250 to 450 Pa·s. If the solution viscosity is less than 200 Pa·s, septum may be formed between pores during formation of pores, and coarsening of the pore structure and formation of a dense coating layer may occur because of high mobility of the polymer in the process for moisture absorption of a cast film, and thus the final pore structure may not be desirable. If the solution viscosity exceeds 600 Pa·s, water is not easily diffused in the film in the process for moisture absorption, thus causing non-homogenization of pore shapes in a thickness direction.

Using the film forming solution prepared as mentioned above, a porous film is produced using a so-called "solution casting" method. The method of producing a porous film by solution casting typically includes a wet type method, a precipitation method, and the like. In the wet type method using a coagulation bath, dehomogenization of pore shapes in a thickness direction and formation of a dense coating layer on a film surface may occur, and septum may be likely to be formed between pores. Therefore, it is preferred that a film is formed by a precipitation method, which is easy to uniformly control a pore structure of a porous film, to allow the pore structure to be desirable.

When a porous film is produced by a precipitation method, first, a film forming solution is cast on a support using a spinneret or a die coater to obtain a cast film of the film forming solution, and then the polymer is precipitated to obtain a porous film. Examples of the method in which a polymer is precipitated from a cast film include a method in which a cast film is allowed to absorb moisture under a temperature-controlled and humidity-controlled atmosphere to precipitate a polymer, a method in which the solubility of a polymer is lowered by cooling a cast film to cause phase separation or precipitation, a method in which mist-like water is sprayed over a cast film to precipitate a polymer, and the like. In the cooling method, precipitation of a polymer takes much time, and thus dehomogenization of pore shapes may be likely to occur and productivity may deteriorate. In the method of spraying mist-like water, a dense layer may be formed on a surface. Thus, the method in which a cast film is allowed to absorb moisture under a temperature-controlled and humidity-controlled atmosphere is preferred since it can optionally control the supply rate and amount of water, thus making it possible to form a homogeneous porous structure within a short time.

A description will be made on the method of forming a pore structure of a porous film, which is fine and includes less septum between pores by a method in which a cast film is allowed to absorb moisture under a temperature-controlled and humidity-controlled atmosphere. The method in which a polymer is precipitated by moisture absorption is a method in which phase separation is induced between a polymer and a mixed solution of good solvent/water by supplying water, which is a poor solvent to the polymer, to a polymer solution containing the polymer dissolved in the good solvent, thus making it impossible to dissolve the polymer, leading to precipitation. Namely, the shape and size of a pore structure formed at the time is decided by the proceeding degree of phase separation until the structure is fixed after the completion of precipitation of the polymer. Since water is absorbed from the surface side which is not in contact with a support of a cast film, the concentration of water increases from the surface side of the cast film. If the polymer in the solution has high mobility, the polymer moves to the more stable back side (support side) and aggregates. As a result, concentration gradient of the polymer occurs in a thickness direction of the cast film, and thus a pore structure on the side not in contact with the support (surface side) may become coarse while a pore structure on the side in contact with the support may become a structure which is drastically dense or clogged, in the obtained porous film. Thus, to suppress coarsening of pore diameters, formation of a septum between pores due to polymer aggregation and nonformulization of a pore structure in a thickness direction, there is a need to rapidly precipitate the polymer in the cast film and, thus, it is effective to fix the structure by rapidly causing moisture absorption in a state where mobility of the polymer is suppressed to a low level.

To suppress mobility of the polymer to a low level, it is preferred to control the logarithmic viscosity of an aromatic polyamide and the solution viscosity of a film forming solution within the range mentioned above. To shorten duration to precipitation due to moisture absorption, it is effective to use the film forming solution to which water has been added in advance within the above-mentioned range, an to increase the absolute humidity by raising the atmospheric temperature and the relative humidity. If the atmospheric temperature is raised, the solution temperature of the cast film is also raised, leading to a decrease in the solution viscosity and an improvement in solubility of the polymer, and thus it is effective to suppress solution temperature rise during moisture absorption by controlling the atmospheric temperature within the range mentioned below and using a support mentioned below.

In the production process of a porous film, volumetric humidity of a temperature-controlled and humidity-controlled atmosphere is preferably set at 10 to 180 $g/m^3$, more preferably 30 to 100 $g/m^3$, and still more preferably 40 to 90 $g/m^3$. Within the range where this absolute humidity is satisfied, the atmospheric temperature is preferably set at 20 to 70° C., and the relative humidity is preferably set at 60 to 95% RH. More preferably, the atmospheric temperature is 30 to 60° C., and the relative humidity is 70 to 90% RH. If the temperature is lower than 20° C., precipitation of the polymer due to moisture absorption mildly proceeds because of low absolute humidity, thus taking much time for porosity forming, leading to proceeding of formation of septum between pores and coarsening of the pore structure, and nonformulization of the pore structure in a thickness direction. There is a need to decrease the film forming rate or increase the process length of moisture absorption, and thus productivity may deteriorate. If the temperature exceeds 70° C., the mobility of the polymer increases with a rise in the solution temperature of the cast film. Since the solubility of the polymer itself is improved, much more moisture is required until the structure is fixed by precipitation, resulting in increase in time required for moisture absorption. As a result, formation of a septum between pores, coarsening of the pore structure, and nonformulization of the pore structure in a thickness direction may proceed. If the relative humidity is less than 60% RH, drying of the solvent may proceed as compared to moisture absorption, thus forming no porous structure. If the relative humidity exceeds 95% RH, moisture absorption on a surface of the cast film rapidly occurs to form a dense layer on a surface, and thus the pore structure and Gurley permeability may not be desirable and no through hole may be formed. Unstable atmospheric control may cause deterioration of productivity. The treatment time under a temperature-controlled and humidity-controlled atmosphere is preferably controlled to 0.5 to 2 minutes, and more preferably 0.5 to 1.5 minutes.

In the case of moisture absorption, heat of dissolution of water and good solvent causes significant rise in temperature of a film forming solution in the cast film, and thus control of rise in the temperature becomes an important element. Examples of the method in which a rise in temperature of the film forming solution is suppressed in this step include a method in which a support having high heat capacity is used, a method in which a support is continuously cooled, and the like.

When using the method in which a support having high heat capacity is used, it is preferred to use a support in which heat capacity per 1 $m^2$ of a surface area is 0.2 kJ/K or more, more preferably 1.0 kJ/K or more, still more preferably 2.0 kJ/K or more, and most preferably 3.0 kJ/K or more. It is possible to control the heat capacity of the support by the material of the (specific heat and density are decided thereby) and thickness. Examples of the material of the support include, but are not particularly limited to, stainless steel, glass, resin such as polyethylene terephthalate (PET), and the like. For example, when using stainless steel (SUS304, SUS316), it is preferred to use a plate-like object or an endless belt which has a thickness of 0.05 mm (heat capacity per 1 m² of a surface area is 0.23 kJ/K at this time) or more. As long as the heat capacity of the whole support is within the above range, a support including a plurality of materials laminates thereon may be use. In view of productivity, it is particularly preferred to use a stainless steel belt as the support.

Meanwhile, when using the method in which the support is continuously cooled, a support having a thermal conductivity of 10 W/m·K or more is preferably used. Examples of such support include aluminum (thermal conductivity of 204 W/m·K), stainless steel (thermal conductivity of 17 W/m·K), and the like. At this time, it is preferred to control the temperature $T_b$ (° C.) of the support in the moisture absorption step within a range where the temperature $T_a$ (° C.) of a temperature-controlled and humidity-controlled atmosphere satisfies the following inequality: $T_a-70 \leq T_b \leq T_a-10$. If $T_a-70 > T_b$, condensation may rapidly occur on a surface of a cast film in the moisture absorption step, thus forming a dense coating layer. If $T_b > T_a-10$, it may be impossible to sufficiently suppress a rise in temperature of a film forming solution due to heat of dissolution, thus failing to obtain a porous film having a fine and few-septate pore structure.

Of these methods, in view of productivity, the method in which a support having a large heat capacity is used is more preferred.

The aromatic polyamide porous film obtained by the above step is introduced into a wet type bath, together with a support, or after removing from the support, and then a solvent, a hydrophilic polymer not incorporated, and additives such as an inorganic salt are removed. There is no particular limitation on the bath composition, and it is preferred to use water, or an organic solvent/water mixture in view of economical efficiency and ease of handling. The wet type bath may contain an inorganic salt. At this time, drawing or relaxation of a porous film may be performed at the same time, or the porous film may be introduced in a wet type bath without grasping a width direction thereof, leading to free shrinkage. The wet bath temperature is preferably 20° C. or higher since a solvent can be efficiently removed. If the bath temperature is lower than 20° C., the solvent may remain to cause bumping during a heat treatment, leading to deterioration of toughness. Alternatively, the unincorporated hydrophilic polymer may remain to cause elution in an electrolytic solution when used as a separator. There is no particular limitation on the upper limit of the bath temperature, and it is efficient to limit the bath temperature up to 90° C., considering an influence of vaporization or boiling of water on the generation of bubbles. The introduction time is preferably set at 1 to 20 minutes.

The porous film after removal of the solvent is then subjected to a heat treatment by a tenter, or the like. It is preferred that heat treatment is performed at high temperature of 220 to 300° C. after predrying at 100 to 210° C. so as to achieve both toughness and heat resistance of a porous film. Predrying is performed for the purpose of removing moisture incorporated inside the polymer before heat treatment at high temperature. If the temperature of predrying is lower than 100° C., moisture inside the polymer cannot be removed, and mechanical properties such as elongation at break may decrease as a result of moisture bumping and foaming of a porous film during heat treatment at high temperature in the subsequent process. On the other hand, if the temperature exceeds 210° C., mechanical properties such as elongation at break may decrease due to bumping and bubbling of the internal water during predrying. A higher drying temperature is preferable within the range mentioned above, and more preferably 150 to 210° C.

It is preferred that a heat treatment is applied at high temperature of 220 to 300° C. after predrying. If the temperature of the heat treatment at high temperature is lower than 220° C., a thermal shrinkage rate may increase because of insufficient heat resistance of a porous film. While heat resistance of the porous film is more improved as the temperature of the heat treatment at high temperature becomes higher. However, if the temperature exceeds 300° C., mechanical properties such as breaking elongation may deteriorate due to decomposition of the polymer. At this time, drawing and relaxation may be applied in a width direction.

The aromatic polyamide porous film can be suitably used as a separator for batteries such as a lithium ion secondary batteries since it has excellent heat resistance and has high porosity regardless of being fine, and also has a few-septate pore structure. A secondary battery using the aromatic polyamide porous film as a separator can prevent short-circuiting between positive and negative electrodes due to dendrite-like metal precipitated during charging and discharging and foreign substances mixed during the production process because of a fine structure of a porous film. Because of having a pore structure with low resistance, it ensures high rate characteristics and is also capable of suppressing deterioration when used for a long period of time. It is possible to maintain high safety even if the temperature of the obtained secondary battery reaches high temperature by thermal runaway since it has excellent heat resistance. Accordingly, a secondary battery using the aromatic polyamide porous film as a separator can be suitably used as a power source of portable electronic equipment; transport facilities such as electric vehicles (EV), hybrid electric vehicles (HEV) and plug-in hybrid electric vehicles (PHEV); and large-sized industrial equipment such as industrial crane. The secondary battery can also be suitably used as an electric storage device for power leveling and smart grid in a solar battery, a wind turbine generator, and the like.

An example of our battery includes a lithium ion secondary battery. The lithium ion secondary battery has a structure in which a non-aqueous electrolytic solution is impregnated into battery elements including a negative electrode and a positive electrode disposed in opposition to each other via a separator, which are sealed in an exterior material.

Examples of the negative electrode include those in which a negative electrode mixture of a negative electrode active material, a conductive auxiliary and a binder is formed on a current collector. A material capable of doping and dedoping lithium ions is used as a negative electrode active material. Specific examples thereof include carbon materials such as graphite and carbon, silicon oxide, silicon alloy, tin alloy, lithium metal, lithium alloy, and the like. Carbon materials such as acetylene black and Ketjen black are used as a conductive auxiliary. A styrene-butadiene rubber and polyvinylidene fluoride are used as a binder. A copper foil, a stainless steel foil, a nickel foil, and the like are used as the current collector.

Examples of the positive electrode include those in which a positive electrode mixture of a positive electrode active material, a conductive auxiliary and a binder is formed on a current collector. A lithium complex oxide containing at least one transition metal such as Mn, Fe, Co or Ni is used as the positive electrode active material. Specific examples thereof include lithium nickelate, lithium cobaltate, lithium manganate, and the like. Carbon materials such as acetylene black and Ketjen black are used as a conductive auxiliary. Polyvinylidene fluoride is used as a binder. An aluminum foil and a stainless steel foil are used as a current collector.

A solution prepared by dissolving a lithium salt in a non-aqueous solvent can be used as the non-aqueous electrolytic solution. Examples of the lithium salt include $LiPF_6$, $LiBF_4$, $LiClO_4$, $LiN(SO_2CF_3)_2$, and the like. Examples of the non-aqueous solvent include propylene carbonate, ethylene carbonate, dimethyl carbonate, diethyl carbonate, ethylmethyl carbonate, γ-butyrolactone, and the like. Usually, a mixture of two or more kinds of these solvents is used.

Examples of the exterior material include a metal can or an aluminum laminate pack. The shape of the battery is not particularly limited and may be any shape such as coin shape, cylindrical shape or square shape.

EXAMPLES

Methods of Measurement of Physical Properties and Methods for Evaluation of Effect The methods of measurement of physical properties in the Examples were performed by the following procedures.
(1) Logarithmic Viscosity ($\eta_{inh}$)

A polymer was dissolved in N-methyl-2-pyrrolidone (NMP) containing 2.5% by mass of lithium bromide (LiBr) added therein in the concentration of 0.5 g/dl, and then the flow time was measured at 30° C. using an Ubbelohde viscometer. NMP of a blank containing no polymer dissolved therein was also measured in the same manner, and then the logarithmic viscosity ($\eta_{inh}$) was calculated using the following equation.

$$\eta_{inh}(dl/g)=[ln(t/t_0)]/0.5$$

where
$t_0$: flow time of blank (seconds)
t: flow time of sample (seconds)
(2) Solution Viscosity Using a RB80U model viscometer (manufactured by TOKI SANGYO CO., LTD.), the solution viscosity was measured at 30° C. and 10 rpm by a ST rotor (rotor code No. 29).
(3) Total Number of Branch Points, Average Tortuosity First, width direction (TD)-thickness direction (ZD) cross-section of a sample was observed using a scanning electron microscope (SEM). The step of cutting a sample using focused ion beam (FIB) to obtain a TD-ZD cross-section, and the step of observing the obtained TD-ZD cross-section using SEM were repeatedly carried out to the sample in a longitudinal direction (MD) 151 times at intervals of 20 nm to obtain a continuous TD-ZD cross-section image in an MD direction over the length of 3 μm at intervals of 20 nm. The observation conditions are as follows.
  Apparatus: Dual Beam apparatus Strata 400S (manufactured by FEI Company)
  Acceleration voltage: 2 kV
  Processing magnification: 50,000-fold
  Processing area: 3 μm (TD)×3 μm (ZD)
  Slice conditions: 20 nm step×151 times (MD)
  Sample pretreatment: pore portion is embedded in a resin Next, using image analysis software VG studio Max 1.2 (manufactured by Nihon Visual Science, Inc.), a continuous cross-section image obtained by the above method was subjected to gradation conversion to give a resin portion and a pore portion, and then a three-dimensional image in the observed area of 3 cubic micrometers was reconstructed. The obtained three-dimensional reconstructed image was subjected to a thinning process. The thinning process is the process of segmentalizing the center of the pore of the pore portion of the three-dimensional image. The structure of the pore path can be analyzed by this process. The number of branch points of the pore in the analytical area was counted to obtain total number of branch points in the area of 3 cubic micrometers.

Path lengths of all pores in an analytical direction were determined and the all path lengths were averaged to obtain an average path length of the pore. The obtained average path length of the pore was divided by a distance (3 μm in thickness, longitudinal and width directions) of an area in an analytical direction to obtain an average tortuosity. The analysis was carried out at an image resolution of 10 nm/pixel.

The above observation and analysis were carried out with respect to three areas in total of a layer from one surface of a sample to 3 μm in a thickness direction of a film, a layer from the other one surface to 3 μm in a thickness direction, and a layer having a thickness of 3 μm in the center in a thickness direction (optional with respect to the position of MD, TD), and then total number of branch points, and an average tortuosity in a thickness direction, a longitudinal direction and a width direction were calculated with respect to each area. An average of the respective three analytical values obtained from three areas was regarded as each analytical value in the present invention. As used herein the "average" means the value obtained by arithmetic mean. The same shall apply unless otherwise specified.
(4) Lithium Ion Diffusion Coefficient In the state where an electrolytic solution is permeated into a sample and then held, a diffusion coefficient of lithium ions was determined by a pulsed-field-gradient nuclear magnetic resonance (PFG-NMR) method. To measure the diffusion coefficient in a thickness direction, a sample cut into a circle of 4 mm in diameter was introduced into a microsample tube of 5 mm in an inner diameter 5 mm, and then stacked in a total thickness of 5 mm or more. At this time, if a gap exists between samples to be laminated or between the sample and the side of the sample tube, a measured value derived from lithium ions outside the sample pore (in a bulk electrolytic solution) is observed so that the sample was introduced into the sample tube in a sufficiently dense manner and then the following electrolytic solution was permeated thereinto. Under the following measurement conditions, a diffusion coefficient of lithium ions was determined by the measurement.
  Electrolytic solution: 1M $LiN(SO_2CF_3)_2$ (LiTFSI)
  Ethylene carbonate/methylethyl carbonate (1:2 vol %)
  Apparatus: ECA-500 (manufactured by JEOL Ltd.)
  Measuring frequency: 194.4 MHz
  Lock solvent: none
  Cumulated number: 16 times
  Measuring temperature: 30° C.
  Pulse sequence: BPPLED
  Magnetic field gradient strength: 0.1 to 3.0 T/m
  Diffusion time: 150 ms
  Gradient magnetic field application time: 2 ms
  Number of steps: 16
  Analysis method: CONTIN A peak top of diffusion coefficient distribution of a two-dimensional spectrum (DOSY spectrum) obtained by analysis due to CONTIN was regarded as a diffusion coefficient of lithium ions existing in a sample pore.

(5) Thickness

Using a constant pressure thickness gauge FFA-1 (manufactured by Ozaki Mfg. Co., Ltd.), the thickness of a porous film was measured. A probe diameter is 5 mm, and a measuring load is 1.25 N. The thickness was measured at 10 positions at intervals of 20 mm in a width direction, and then an average was determined.

(6) Gurley Permeability

Using a B type Gurley densometer (manufactured by Yasuda Seiki Seisakusho, Ltd.), Gurley permeability was measured according to the method specified in JIS-P8117 (1998). A porous film sample was clamped to a circular hole with a diameter of 28.6 mm and an area of 645 mm$^2$, and the inner cylinder (inner cylinder weight of 567 g) was operated to pass air from the cylinder to outside the cylinder through the test circular hole portion, and the duration required for passage of 100 ml of air was measured to determine the Gurley permeability.

(7) Porosity

The thickness and mass of a 200 mm square sample were measured and the apparent density (bulk density) $d_1$ of a porous film was determined. Porosity was calculated from the true density $d_0$ of the polymer using the following equation.

Porosity(%)=$(1-d_1/d_0)\times 100$.

(8) Thermal Shrinkage Rate

Strips of 10 mm in width and 220 mm in length were cut out from porous films by cutting them in such a manner that the long side agrees with the measuring direction. The positions about 10 mm from each end of the long side were marked, and the distance between the marks was defined as $L_1$. A strip was heat-treated in a hot air oven at 200° C. for 10 minutes substantially in a tension-free state, and the distance between the marks was defined as $L_2$, followed by calculation by the equation shown below. Five measurements were made in the length direction and in the width direction of the film, and their averages were calculated.

Thermal shrinkage rate(%)=$((L_1-L_2)/L_1)\times 100$ (9) Evaluation of Battery

As mentioned below, a coin-shaped lithium ion secondary battery was produced and then evaluated.

Positive Electrode

Using a NMP solution of PVdF (concentration 6% by mass), a positive electrode material paste was prepared according to the formulation: 89.5 parts by mass of lithium cobaltate (LiCoO$_2$, manufactured by NIPPON CHEMICAL INDUSTRIAL CO., LTD.), 4.5 parts by mass of acetylene black (manufactured by DENKI KAGAKU KOGYO KABUSHIKI KAISHA) and 6 parts by mass (dry mass) of polyvinylidene fluoride (PVdF, manufactured by KUREHA CORPORATION). The obtained paste was applied on a 20 μm thick aluminum foil (manufactured by UACJ Foil corporation) as a current collector, followed by drying and further punching into a circle having a diameter 13 mm to obtain a positive electrode.

Negative Electrode

Using a NMP solution of PVdF (concentration 6% by mass), a negative electrode material paste was prepared according to the formulation: 87 parts by mass of Mesophase carbon microbeads (MCMB, manufactured by Osaka Gas Chemicals Co., Ltd.), 3 parts by mass of acetylene black and 10 parts by mass (dry mass) of PVdF. The obtained paste was applied on a 18 μm thick copper foil (manufactured by UACJ Foil corporation) as a current collector, followed by drying and further punching into a circle having a diameter 14.5 mm to obtain a negative electrode.

Electrolytic Solution

An electrolytic solution to be used was prepared by dissolving 1 mol/L of LiPF$_6$ in a mixed solution containing 30 parts by mass of ethylene carbonate and 70 parts by mass of dimethyl carbonate.

Assembling

On a spacer of a welded sealing plate mounted with a gasket, the above negative electrode was mounted so that a negative electrode material faces upward, and then the electrolytic solution was injected from above. A porous film (circle having a diameter of 17 mm) of a sample, as a separator, was mounted thereon, and then the electrolytic solution was injected from above the separator. Next, the positive electrode was mounted so that the positive electrode material faces downward, and then a case was mounted. After sealing using a caulking machine, a coin-shaped battery having a diameter of 20 mm and a thickness of 3.2 mm was produced.

Finishing Charging and Discharging

The coin-shaped battery thus obtained was charged at a constant current of 0.2 C (1 mA) until a battery voltage becomes 3.7 V and aged at 20° C. for 96 hours after charging. Next, the battery was discharged at a constant current of 0.2 C until a battery voltage becomes 3.0 V. After this aging treatment, the battery was charged at a constant current of 0.2 C until a battery voltage becomes 4.2 V and then discharged at a constant current of 0.2 C until a battery voltage becomes 3.0 V. Regarding this charging and discharging as 1 cycle, finishing charging and discharging were completed by repeating 4 cycles in total of charging and discharging. All finishing charging and discharging were performed under an atmosphere at 20° C. The following battery evaluations "a to c" were carried out using a coin-shaped battery subjected to finishing charging and discharging.

If the battery is rated A, B or C in all evaluations "a to c", it can be said to be an excellent battery in practical use. More preferably, the battery is rated A or B in all evaluations "a to c". Still more preferably, the battery is rated A in all evaluations "a to c".

a. Rate Characteristics

All the evaluations were performed under an atmosphere at 20° C. The coin-shaped battery thus obtained was charged at a constant current of 0.2 C (1 mA) until a battery voltage becomes 4.2 V, and then discharged at a constant current of 0.2 C until a battery voltage becomes 3.0 V. The discharge capacity obtained at this time was regarded as a discharge capacity at 0.2 C. Next, the battery was charged at a constant current of 0.2 C until a battery voltage becomes 4.2 V, and then discharged at a constant current of 3 C (15 mA) until a battery voltage becomes 3.0 V. The discharge capacity obtained at this time was regarded as a discharge capacity at 3 C. Using the following equation, a capacity retention rate was calculated from these results, and the evaluation was performed by the following criteria A to D.

Capacity retention rate(%)=(discharge capacity at 3 C)/(discharge capacity at 0.2 C)×100

A: 60% or more
B: 50% or more and less than 60%
C: 40% or more and less than 50%
D: less than 40% b. Cycle Characteristics

All the evaluations were performed under an atmosphere at 20° C. The coin-shaped battery thus obtained was charged at a constant current of 0.2 C until a battery voltage becomes 4.2 V, and then discharged at a constant current of 0.2 C until a battery voltage becomes 3.0 V. Regarding this charging and discharging as 1 cycle, finishing charging and discharging were performed by repeating 500 cycles in total. Using the following equation, a capacity retention rate was calculated from a discharge capacity of the 1st cycle and that of the 500th cycle, and the evaluation was performed by the following criteria A to D.

Capacity retention rate(%)=(discharge capacity of 500th cycle)/(discharge capacity of 1st cycle)×100

A: 60% or more
B: 50% or more and less than 60%
C: 40% or more and less than 50%
D: less than 40%.

c. Storage Characteristics

The coin-shaped battery thus obtained was charged under an atmosphere at 20° C. at a constant current of 0.2 C until a battery voltage becomes 4.2 V, and then discharged under an atmosphere at 20° C. at a constant current of 0.2 C until a battery voltage becomes 3.0 V. The discharge capacity obtained at this time was regarded as an initial discharge capacity. Next, the coin-shaped battery was charged under an atmosphere at 20° C. at a constant current of 0.2 C until a battery voltage becomes 4.2 V. The battery in this charged state was stored under an atmosphere at 80° C. for 20 days. After storage, the battery was discharged under an atmosphere at 20° C. at a constant current of 0.2 C until a battery voltage becomes 3.0 V. After 1 cycle of charging and discharging was performed again under an atmosphere at 20° C. at a constant current of 0.2 C, the discharge capacity was measured. The discharge capacity obtained at this time was regarded as a discharge capacity after storage. Using the following equation, the capacity recovery ratio was calculated from these results, and the evaluation was performed by the following criteria A to D.

Capacity recovery ratio(%)=(discharge capacity after storage)/(initial discharge capacity)×100

A: 80% or more
B: 70% or more and less than 80%
C: 60% or more and less than 70%
D: less than 60%

Our films, separators and batteries will be described in more specifically below by way of Examples, but this disclosure is not limited thereto.

Example 1

In dehydrated N-methyl-2-pyrrolidone (NMP, manufactured by Mitsubishi Chemical Corporation), 2-chloro-1,4-phenylenediamine (manufactured by Nippon Kayaku Co., Ltd.) and 4,4'-diaminodiphenyl ether (manufactured by Tokyo Chemical Industry Co., Ltd.) were dissolved in the amount equivalent to 50 mol % and 50 mol %, respectively, relative to the total amount of the diamine, under a nitrogen gas flow, followed by cooling to 30° C. or lower. In the state where the atmosphere in the system is maintained at 30° C. or lower under a nitrogen gas flow, 2-chloroterephthaloyl chloride (manufactured by Nippon Light Metal Company, Ltd.) was added in the amount equivalent to 98 mol % relative to the total amount of the diamine. After addition in the total amount, the mixture was stirred for about 2 hours, thus completing polymerization to obtain a solution of an aromatic polyamide. The solution thus obtained by polymerization was neutralized with lithium carbonate (manufactured by Honjo Chemical Corporation) and diethanolamine (manufactured by Tokyo Chemical Industry Co., Ltd.) in the amount of 97 mol % and 6 mol %, respectively, relative to the total amount of the acid chloride to obtain a solution of an aromatic polyamide. The obtained aromatic polyamide exhibited a logarithmic viscosity $\eta_{inh}$ of 2.5 dl/g.

Next, polyvinylpyrrolidone (PVP, manufactured by ISP Corporation, K90), RO water, and NMP for dilution were added in the obtained aromatic polyamide solution so as to obtain the following composition, followed by stirring at 60° C. for 2 hours to obtain a film forming solution. Regarding final contents of the respective components relative to 100% by mass of the film forming solution are as follows: namely, the content of the aromatic polyamide is 10% by mass, the content of PVP is 5% by mass and the content of water is 10% by mass, and NMP and a neutralized salt (lithium chloride, diethanolamine hydrochloride) contained in the polymerization solution account for the remaining 75% by mass.

This film forming solution was applied on a 1 mm thick stainless steel (SUS316) belt (heat capacity per 1 m$^2$ of a surface area: 4.7 kJ/K·m$^2$) as a support through a spinneret in the form of a film, and then treated in temperature-controlled and humidity-controlled air at a temperature of 50° C. and a relative humidity of 85% RH for 1 minute until the coating film is devitrified. Next, the devitrified coating film was removed from the belt and then introduced in a water bath at 60° C. for 2 minutes, thus extracting a solvent. Subsequently, the obtained film was subjected to a heat treatment in a tenter at 200° C. for 1 minute, then at 230° C. for 2 minutes, in a state where both ends are gripped by a clip at a given width to obtain a porous film. Main production conditions of the obtained porous film are shown in Table 1, and the evaluation results are shown in Table 2.

Example 2

In the same manner as in Example 1, except that the amount of 2-chloro-1,4-phenylenediamine was changed to 80 mol % relative to the total amount of the diamine, and that the amount of 4,4'-diaminodiphenyl ether was changed to 20 mol % relative to the total amount of the diamine, the polymerization and neutralization were performed to obtain an aromatic polyamide solution having a logarithmic viscosity $\eta_{inh}$ of 2.5 dl/g.

Next, to remove a neutralized salt in an polymerization solution, this solution was charged in a mixer together with water, and a polymer was taken out after precipitation while stirring. The polymer thus taken out was washed with water, dried under reduced pressure at 120° C. for 24 hours, thus isolating an aromatic polyamide.

In the same manner as in Example 1, except that the isolated aromatic polyamide is used and the composition of the film forming solution is changed to the composition consisting of 11% by mass of an aromatic polyamide, 5% by mass of PVP, 5% by mass of water and 79% by mass of NMP, and the treatment time in temperature-controlled and humidity-controlled air is changed to 90 seconds, a porous film was obtained. Main production conditions of the obtained porous film are shown in Table 1, and the evaluation results are shown in Table 2.

Example 3

In the same manner as in Example 1, except that logarithmic viscosity $\eta_{inh}$ of the aromatic polyamide is changed to 2.0 dl/g, a porous film was obtained. Main production conditions of the obtained porous film are shown in Table 1, and the evaluation results are shown in Table 2.

Example 4

In the same manner as in Example 1, except that the composition of film forming solution is changed to the composition consisting of 10% by mass of an aromatic polyamide, 5% by mass of PVP and 3% by mass of water, and the treatment time in temperature-controlled and humidity-controlled air is changed to 2 minutes, a porous film was obtained. Main production conditions of the obtained porous film are shown in Table 1, and the evaluation results are shown in Table 2.

Example 5

In the same manner as in Example 1, except that the temperature-controlled and humidity-controlled air is changed to air controlled at a temperature of 35° C. and a relative humidity of 85% RH, and the treatment time in temperature-controlled and humidity-controlled air is changed to 90 seconds, a porous film was obtained. Main production conditions of the obtained porous film are shown in Table 1, and the evaluation results are shown in Table 2.

Example 6

In the same manner as in Example 1, except that the support is changed to a 0.5 mm thickness stainless steel (SUS316) belt (heat capacity per 1 $m^2$ of surface area: 2.4 $kJ/K \cdot m^2$), a porous film was obtained. Main production conditions of the obtained porous film are shown in Table 1, and the evaluation results are shown in Table 2.

Example 7

The same film forming solution as in Example 1 was applied on a 5 mm thickness glass plate (eat capacity per 1 $m^2$ of surface area: 11.3 $kJ/K \cdot m^2$) as a support in the form of a film using an applicator, and then treated in temperature-controlled and humidity-controlled air at a temperature of 50° C. and a relative humidity of 85% RH for 1 minute until the coating film is devitrified. Next, the devitrificated coating film was removed from the support, fixed to a frame made of stainless steel and then immersed in a water bath at 60° C. for 10 minutes, thus extracting the solvent. Subsequently, the obtained film was subjected to a heat treatment in a hot air oven at 200° C. for 1 minute, then at 230° C. for 2 minutes while being fixed to the frame to obtain a porous film. Main production conditions of the obtained porous film are shown in Table 1, and the evaluation results are shown in Table 2.

Example 8

In the same manner as in Example 1, except that the composition of film forming solution is changed to the composition consisting of 14% by mass of an aromatic polyamide, 5% by mass of PVP and 10% by mass of water, a porous film was obtained. Main production conditions of the obtained porous film are shown in Table 1, and the evaluation results are shown in Table 2.

Example 9

In the same manner as in Example 1, except that the temperature-controlled and humidity-controlled air is changed to air controlled at a temperature of 20° C. and a relative humidity of 85% RH, and the treatment time in temperature-controlled and humidity-controlled air is changed to 2 minutes, a porous film was obtained. Main production conditions of the obtained porous film are shown in Table 1, and the evaluation results are shown in Table 2.

Example 10

In the same manner as in Example 1, except that the temperature-controlled and humidity-controlled air is changed to air controlled at a temperature of 70° C. and a relative humidity of 85% RH, and the treatment time in temperature-controlled and humidity-controlled air is changed to 2 minutes, a porous film was obtained. Main production conditions of the obtained porous film are shown in Table 1, and the evaluation results are shown in Table 2.

Example 11

In the same manner as in Example 7, except that the support is changed to a 50 μm thickness stainless steel (SUS304) foil (heat capacity per 1 $m^2$ of surface area: 0.2 $kJ/K \cdot m^2$), a porous film was obtained. Main production conditions of the obtained porous film are shown in Table 1, and the evaluation results are shown in Table 2.

Comparative Example 1

In the same manner as in Example 1, except that the monomers for obtaining an aromatic polyamide are changed to 1,3-phenylenediamine (manufactured by Tokyo Chemical Industry Co., Ltd.), 1,4-phenylenediamine (manufactured by Tokyo Chemical Industry Co., Ltd.) and isophthaloyl chloride (manufactured by Tokyo Chemical Industry Co., Ltd.) in the amount equivalent to 70 mol %, 30 mol % and 98 mol %, respectively, relative to the total amount of the diamine and the logarithmic viscosity $\eta_{inh}$ of the aromatic polyamide to 2.1 dl/g, and the composition of film forming solution is changed to the composition consisting of 14% by mass of an aromatic polyamide, 5% by mass of PVP and 10% by mass of water, a porous film was obtained. Main production conditions of the obtained porous film are shown in Table 1, and the evaluation results are shown in Table 2.

Comparative Example 2

In the same manner as in Example 1, except that the logarithmic viscosity $\eta_{inh}$ of the aromatic polyamide is changed to 1.8 dl/g, a porous film was obtained. Main production conditions of the obtained porous film are shown in Table 1, and the evaluation results are shown in Table 2.

Comparative Example 3

In the same manner as in Example 1, except that the logarithmic viscosity $\eta_{inh}$ of the aromatic polyamide is changed to 1.8 dl/g and the composition of film forming solution is changed to the composition consisting of 16% by mass of an aromatic polyamide, 5% by mass of PVP and 10% by mass of water, a porous film was obtained. Main production conditions of the obtained porous film are shown in Table 1, and the evaluation results are shown in Table 2.

Comparative Example 4

In the same manner as in Example 1, except that the logarithmic viscosity $\eta_{inh}$ of the aromatic polyamide was changed to 1.8 dl/g and the composition of film forming solution was changed to the composition consisting of 12% by mass of an aromatic polyamide, 20% by mass of PVP and 10% by mass of water, a porous film was obtained. Main production conditions of the obtained porous film are shown in Table 1, and the evaluation results are shown in Table 2.

Comparative Example 5

In the same manner as in Example 1, except that the logarithmic viscosity $\eta_{inh}$ of the aromatic polyamide is changed to 2.8 dl/g and the composition of film forming solution is changed to the composition consisting of 4% by mass of an aromatic polyamide, 10% by mass of PVP and 10% by mass of water, a porous film was obtained. Main production conditions of the obtained porous film are shown in Table 1, and the evaluation results are shown in Table 2.

Comparative Example 6

In the same manner as in Example 1, except that the composition of film forming solution was changed to the composition consisting of 10% by mass of an aromatic polyamide, 5% by mass of PVP and none of water, and the treatment time in the temperature-controlled and humidity-controlled air is changed to 3 minutes. Main production conditions of the obtained porous film are shown in Table 1, and the evaluation results are shown in Table 2.

Comparative Example 7

The same film forming solution as in Example 1 was applied on a 5 mm thickness glass plate as a support in the form of a film using an applicator. Then, the obtained coating film was immersed in a coagulating liquid containing 50% by mass of water and 50% by mass of NMP at a temperature 25° C., together with the support, and the devitrificated coating film was removed from the support. Thereafter, in the same manner as in Example 7, the devitrificated coating film was fixed to a frame made of stainless steel, washed with water and then subjected to a heat treatment to obtain a porous film. Main production conditions of the obtained porous film are shown in Table 1, and the evaluation results are shown in Table 2.

Comparative Example 8

In the same manner as in Example 1, except that the support is changed to a 75 μm thick polyethylene terephthalate (PET) film (U34, manufactured by Toray Industries, Inc., heat capacity per 1 m² of a surface area: 0.1 kJ/K·m²), a porous film was obtained. Main production conditions of the obtained porous film are shown in Table 1, and the evaluation results are shown in Table 2.

TABLE 1

| | Film forming solution | | | | Support | | | | |
| | | | | | | | | Temperature and humidity control conditions | |
| | Logarithmic viscosity of | | | | | | Heat capacity per 1 m² of | | |
| | aromatic | Addition amount (% by mass) | | | Solution | | | surface | | Relative | Absolute |
| | polyamide (dl/g) | Aromatic polyamide | Hydrophilic polymer | Water | viscosity (Pa·s) | Material | Thickness (mm) | area (kJ/K) | Temperature (° C.) | humidity (% RH) | humidity (g/m³) |
|---|---|---|---|---|---|---|---|---|---|---|---|
| Example 1 | 2.5 | 10 | 5 | 10 | 380 | SUS316 | 1 | 4.7 | 50 | 85 | 70 |
| Example 2 | 2.5 | 11 | 5 | 5 | 310 | SUS316 | 1 | 4.7 | 50 | 85 | 70 |
| Example 3 | 2.0 | 10 | 5 | 10 | 240 | SUS316 | 1 | 4.7 | 50 | 85 | 70 |
| Example 4 | 2.5 | 10 | 5 | 3 | 390 | SUS316 | 1 | 4.7 | 50 | 85 | 70 |
| Example 5 | 2.5 | 10 | 5 | 10 | 380 | SUS316 | 1 | 4.7 | 35 | 85 | 34 |
| Example 6 | 2.5 | 10 | 5 | 10 | 380 | SUS316 | 0.5 | 2.3 | 50 | 85 | 70 |
| Example 7 | 2.5 | 10 | 5 | 10 | 380 | Glass | 5 | 11.3 | 50 | 85 | 70 |
| Example 8 | 2.5 | 14 | 5 | 10 | 470 | SUS316 | 1 | 4.7 | 50 | 85 | 70 |
| Example 9 | 2.5 | 10 | 5 | 10 | 380 | SUS316 | 1 | 4.7 | 20 | 85 | 15 |
| Example 10 | 2.5 | 10 | 5 | 10 | 380 | SUS316 | 1 | 4.7 | 70 | 85 | 168 |
| Example 11 | 2.5 | 10 | 5 | 10 | 380 | SUS304 | 0.05 | 0.2 | 50 | 85 | 70 |
| Comparative Example 1 | 2.1 | 14 | 5 | 10 | 170 | SUS316 | 1 | 4.7 | 50 | 85 | 70 |
| Comparative Example 2 | 1.8 | 10 | 5 | 10 | 110 | SUS316 | 1 | 4.7 | 50 | 85 | 70 |
| Comparative Example 3 | 1.8 | 16 | 5 | 10 | 300 | SUS316 | 1 | 4.7 | 50 | 85 | 70 |
| Comparative Example 4 | 1.8 | 12 | 20 | 10 | 320 | SUS316 | 1 | 4.7 | 50 | 85 | 70 |
| Comparative Example 5 | 2.8 | 4 | 10 | 10 | 210 | SUS316 | 1 | 4.7 | 50 | 85 | 70 |
| Comparative Example 6 | 2.5 | 10 | 5 | 0 | 400 | SUS316 | 1 | 4.7 | 50 | 85 | 70 |
| Comparative Example 7 | 2.5 | 10 | 5 | 10 | 380 | Glass | 5 | 11.3 | — | — | — |
| Comparative Example 8 | 2.5 | 10 | 5 | 10 | 380 | PET | 0.075 | 0.1 | 50 | 85 | 70 |

TABLE 2

| | Physical properties of porous film | | | | | | | | | | | |
|---|---|---|---|---|---|---|---|---|---|---|---|---|
| | | Gurley permeability | | Thermal shrinkage rate (%) | | Total number of branch points | Average tortuosity | | | Ion diffusion coefficient | Battery characteristics | | |
| | Thickness (μm) | (seconds/ 100 ml) | Porosity (%) | MD | TD | | ZD | MD | TD | (m²/s) | Rate characteristics | Cycle characteristics | Storage characteristics |
| Example 1 | 20 | 85 | 72 | 0.0 | 0.0 | 12,867 | 1.4 | 1.2 | 1.2 | 10.1 | A | A | A |
| Example 2 | 20 | 80 | 70 | 0.0 | 0.0 | 13,790 | 1.3 | 1.2 | 1.2 | 10.7 | A | A | A |
| Example 3 | 20 | 52 | 71 | 0.1 | 0.1 | 7,211 | 1.5 | 1.7 | 1.7 | 9.3 | A | B | B |
| Example 4 | 19 | 120 | 65 | 0.0 | 0.0 | 6,724 | 1.8 | 1.7 | 1.7 | 7.9 | A | B | B |
| Example 5 | 18 | 105 | 69 | 0.0 | 0.0 | 9,215 | 1.6 | 1.6 | 1.6 | 9.2 | A | A | A |
| Example 6 | 18 | 90 | 70 | 0.0 | 0.0 | 11,008 | 1.7 | 1.6 | 1.5 | 8.7 | A | A | A |
| Example 7 | 22 | 80 | 73 | 0.0 | 0.0 | 13,124 | 1.4 | 1.1 | 1.1 | 11.2 | A | A | A |
| Example 8 | 21 | 160 | 65 | 0.0 | 0.0 | 8,216 | 1.8 | 1.8 | 1.8 | 6.5 | B | B | A |
| Example 9 | 17 | 120 | 67 | 0.0 | 0.0 | 4,358 | 1.9 | 2.4 | 2.4 | 4.3 | C | C | C |
| Example 10 | 19 | 104 | 70 | 0.0 | 0.0 | 4,820 | 2.1 | 2.4 | 2.4 | 3.6 | C | C | C |
| Example 11 | 17 | 117 | 69 | 0.0 | 0.0 | 2,721 | 2.1 | 2.6 | 2.6 | 3.4 | C | C | C |
| Comparative Example 1 | 16 | 70 | 59 | 2.1 | 1.9 | 463 | 2.7 | 3.1 | 3.2 | 2.7 | D | D | D |
| Comparative Example 2 | 20 | 41 | 69 | 0.5 | 0.5 | 1,785 | 1.8 | 2.6 | 2.6 | 4.7 | C | D | D |
| Comparative Example 3 | 21 | 235 | 56 | 0.3 | 0.2 | 1,327 | 2.1 | 2.2 | 2.2 | 4.4 | C | D | D |
| Comparative Example 4 | 23 | 214 | 53 | 0.6 | 0.6 | 1,789 | 2.2 | 2.2 | 2.2 | 4.1 | C | D | D |
| Comparative Example 5 | 22 | 91 | 82 | 0.7 | 0.6 | 1,925 | 1.9 | 1.7 | 1.7 | 6.2 | B | D | D |
| Comparative Example 6 | 17 | 182 | 60 | 0.0 | 0.0 | 1,215 | 2.4 | 2.3 | 2.3 | 3.2 | D | D | D |
| Comparative Example 7 | 20 | 52 | 54 | 0.1 | 0.1 | 224 | 3.6 | 4.1 | 4.3 | 1.9 | D | D | D |
| Comparative Example 8 | 16 | 160 | 65 | 0.1 | 0.1 | 1,874 | 2.3 | 2.8 | 2.8 | 2.8 | D | D | D |

INDUSTRIAL APPLICABILITY

Our aromatic polyamide porous films can be suitably used as a separator for a battery such as a lithium ion secondary battery since they have high porosity regardless of being fine, and also have a few-septate pore structure. When the aromatic polyamide porous films are used as a separator for battery, it is possible to prevent short-circuiting of positive and negative electrodes from occurring due to lithium metal precipitated when used as a battery, and foreign substances mixed during the production process. Lithium ions can freely diffuse in a thickness direction and a film face direction, thus making it possible to obtain excellent rate characteristics, and to effectively prevent clogging of pores, short-circuiting and drying up of an electrolytic solution, which are caused by precipitation of lithium metal when used for a long period of time or when a lithium metal negative electrode is used.

The invention claimed is:

1. An aromatic polyamide porous film comprising an aromatic polyamide having a logarithmic viscosity ($\eta_{inh}$) of 2.0 to 3.5 dl/g and polyvinylpyrrolidone having a weight average molecular weight of 500,000 to 2,000,000 and having 5,000 to 15,000 total branch points of pores in an area of 3 cubic micrometers of the film as determined from a three-dimensional structural image of the area created by assembling a series of SEM images of width direction-thickness direction cross-sections of the area in 20 nm increments.

2. The aromatic polyamide porous film according to claim 1, having an average tortuosity in a thickness direction determined from the three-dimensional structural image of 1.2 to 2.1, and an average tortuosity determined from the three-dimensional structural image of 1.0 to 2.1 in both longitudinal and width directions.

3. The aromatic polyamide porous film according to claim 2, having a lithium ion diffusion coefficient in a thickness direction measured by a pulsed-field-gradient NMR analysis method of 4.0 to 12.0 m²/s.

4. The aromatic polyamide porous film according to claim 2, having a thickness of 9 to 40 μm, and a Gurley permeability of 5 to 200 seconds/100 ml.

5. A separator for a battery, comprising the aromatic polyamide porous film according to claim 2.

6. The aromatic polyamide porous film according to claim 1, having a lithium ion diffusion coefficient in a thickness direction measured by a pulsed-field-gradient NMR analysis method of 4.0 to 12.0 m²/s.

7. The aromatic polyamide porous film according to claim 6, having a thickness of 9 to 40 μm, and a Gurley permeability of 5 to 200 seconds/100 ml.

8. A separator for a battery, comprising the aromatic polyamide porous film according to claim 6.

9. The aromatic polyamide porous film according to claim 1, having a thickness of 9 to 40 μm, and a Gurley permeability of 5 to 200 seconds/100 ml.

10. A separator for a battery, comprising the aromatic polyamide porous film according to claim 9.

11. A separator for a battery, comprising the aromatic polyamide porous film according to claim 1.

12. A battery comprising the separator for a battery according to claim 11.

* * * * *